(12) United States Patent
Wang et al.

(10) Patent No.: US 8,533,445 B2
(45) Date of Patent: Sep. 10, 2013

(54) DISABLING A FEATURE THAT PREVENTS ACCESS TO PERSISTENT SECONDARY STORAGE

(75) Inventors: Lan Wang, Cypress, TX (US); Valiuddin Y Ali, Cypress, TX (US); James L. Mondshine, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 827 days.

(21) Appl. No.: 12/427,052

(22) Filed: Apr. 21, 2009

(65) Prior Publication Data

US 2010/0268928 A1    Oct. 21, 2010

(51) Int. Cl.
*G06F 9/00*  (2006.01)
*G06F 15/177*  (2006.01)

(52) U.S. Cl.
USPC ............ 713/2; 713/1; 714/1; 714/2; 714/6.11

(58) Field of Classification Search
USPC .................................. 713/1, 2; 714/1, 2, 6.11
See application file for complete search history.

(56) References Cited

U.S. PATENT DOCUMENTS

| | | | | |
|---|---|---|---|---|
| 6,061,788 A * | 5/2000 | Reynaud et al. | ................... | 713/2 |
| 6,463,509 B1 * | 10/2002 | Teoman et al. | ............... | 711/137 |
| 6,539,456 B2 * | 3/2003 | Stewart | .......................... | 711/113 |
| 6,662,267 B2 * | 12/2003 | Stewart | .......................... | 711/113 |
| 6,959,331 B1 * | 10/2005 | Traversat et al. | ............. | 709/222 |
| 7,036,040 B2 * | 4/2006 | Nicholson et al. | ........... | 714/6.31 |
| 7,159,107 B2 * | 1/2007 | Chen et al. | ......................... | 713/2 |
| 7,181,608 B2 * | 2/2007 | Fallon et al. | ....................... | 713/2 |
| 7,353,240 B1 * | 4/2008 | Takamoto et al. | .................... | 1/1 |
| 7,454,653 B2 * | 11/2008 | Nicholson et al. | ........... | 714/47.2 |
| 7,836,293 B1 * | 11/2010 | Wynia | ................................. | 713/2 |
| 7,962,785 B2 * | 6/2011 | Trika et al. | ........................ | 714/21 |
| 7,979,631 B2 * | 7/2011 | Ahn et al. | ....................... | 711/113 |
| 2002/0078338 A1 * | 6/2002 | Lay et al. | ........................... | 713/2 |
| 2002/0156970 A1 * | 10/2002 | Stewart | .......................... | 711/113 |
| 2003/0084239 A1 * | 5/2003 | Stewart | .......................... | 711/113 |
| 2006/0036806 A1 * | 2/2006 | Garney | .......................... | 711/113 |
| 2007/0005952 A1 * | 1/2007 | Ho | ..................... | 713/2 |
| 2007/0083746 A1 * | 4/2007 | Fallon et al. | ..................... | 713/1 |
| 2007/0162693 A1 * | 7/2007 | Nam | ............................. | 711/113 |
| 2008/0005462 A1 * | 1/2008 | Pyeon et al. | .................. | 711/113 |
| 2008/0028246 A1 * | 1/2008 | Witham | ........................ | 713/330 |
| 2008/0082752 A1 * | 4/2008 | Chary et al. | .................. | 711/118 |
| 2008/0307160 A1 * | 12/2008 | Humlicek | ...................... | 711/113 |
| 2009/0077313 A1 * | 3/2009 | Trika et al. | .................... | 711/113 |
| 2009/0089501 A1 * | 4/2009 | Ahn et al. | ...................... | 711/113 |
| 2009/0132797 A1 * | 5/2009 | Lo | ..................... | 713/2 |
| 2009/0217024 A1 * | 8/2009 | Childs et al. | ...................... | 713/2 |
| 2009/0327607 A1 * | 12/2009 | Tetrick et al. | ................. | 711/118 |

OTHER PUBLICATIONS

Intel Active Management Technology, www.openamt.org, Mar. 10, 2009 (3 pages).
Intel vPro and Intel Centrino Pro Processor Technology Quick Start Guide, Version 1.0, Jul. 2, 2007 (23 pages).
Intel Active Management Technology, Wikipedia, Mar. 10, 2009 (9 pages).

(Continued)

*Primary Examiner* — Jaweed A Abbaszadeh

(57) ABSTRACT

During a boot block part of a boot procedure in an electronic device having a persistent secondary storage, a feature that prevents access to the persistent secondary storage is disabled. The persistent secondary storage is accessed during the boot block part of the boot procedure to retrieve information to perform a predetermined task.

17 Claims, 3 Drawing Sheets

(56) References Cited

OTHER PUBLICATIONS

The Boot Block, www.pcguide.com/ref/mbsys/bios/compBoot-c.html, 2004 (2 pages).

Intel's VPro to boost security, CNET News Article, Apr. 24, 2006 (3 pages).
Intel Centrino 2 with vPro Technology and Intel Core 2 Processor with vPro Technology, White Paper, 2008 (28 pages).
Intel vPro, Wikipedia, Jan. 14, 2009 (7 pages).

* cited by examiner

DISABLING A FEATURE THAT PREVENTS ACCESS TO PERSISTENT SECONDARY STORAGE

BACKGROUND

When an electronic device such as a computer is powered on, or otherwise started (e.g., such as due to a reset), boot code is executed to boot the electronic device. Typically, such boot code is in the form of Basic Input/Output System (BIOS) code. The BIOS code performs a boot procedure that typically starts with running a boot block code that performs various minimal initialization tasks in the electronic device.

Following execution of the boot block code, the boot procedure performs power-on-self-test (POST) to verify the integrity of the BIOS code, to discover and initialize system components, and to perform other tasks. At the end of the boot procedure, the operating system of the electronic device is loaded for execution.

During a boot procedure, certain additional tasks, such as an error recovery task, may have to be performed. An error recovery task is performed in response to detecting a previous failure or other fault in the electronic device. However, certain electronic devices may contain chipsets that have a configuration that interferes with proper performance of the error recovery task during the boot procedure.

BRIEF DESCRIPTION OF THE DRAWINGS

Some embodiments of the invention are described with respect to the following figures.

DETAILED DESCRIPTION

Figure 1:
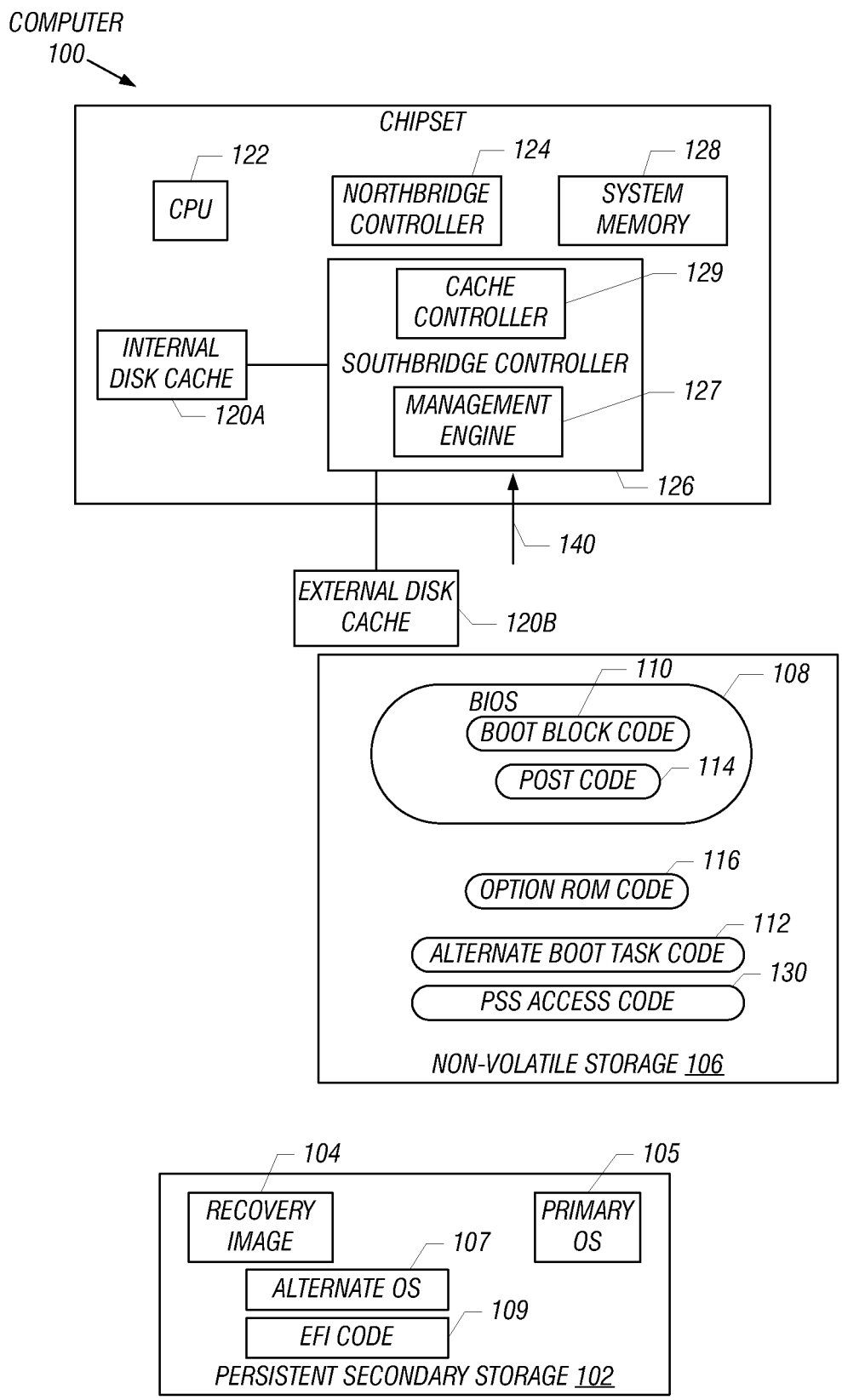
FIG. 1 is a block diagram of an exemplary electronic device that incorporates an embodiment of the invention.

Some electronic devices may contain features that prevent proper performance of certain tasks during a boot procedure. For example, upon detection of a failure or other fault in an electronic device, an error recovery task may be performed upon the next boot procedure of the electronic device. Typically, the error recovery task attempts to access information (e.g., a recovery image) stored on a persistent secondary storage of the electronic device. However, certain chipsets, such as chipsets made by Intel Corporation that implement a disk cache feature (explained further below), may prevent access of the persistent secondary storage of the electronic device during initial parts of the boot procedure of the electronic device. The inability to access the persistent secondary storage will prevent proper execution of the error recovery task.

Alternatively, it may be desirable to perform access of the persistent secondary storage (which may be blocked by the disk cache feature during the boot procedure) when performing other tasks, such as performing tasks to load an alternate operating system (e.g., Linux operating system rather than WINDOWS® operating system), tasks to load an Extensible Firmware Interface (EFI) application (which is related to implementing EFI in the system, where EFI defines a software interface between the operating system and platform firmware), tasks to launch certain preboot applications (to perform certain tasks during system boot), and/or other tasks. More generally, the foregoing tasks (error recovery tasks, tasks to load an alternate operating system, tasks to load an EFI application, tasks to launch preboot applications, etc.) during a boot procedure are referred to as "alternate boot tasks," which can be considered any tasks that would cause the boot procedure of the system to be altered from its normal procedure.

In particular, it may be desired to execute an alternate boot task during a boot block part of the boot procedure. The boot block part of the boot procedure refers to a part of the boot procedure when a boot block code is executed. The boot block code performs certain initial tasks in the electronic device. Generally, the boot block code can refer to an initial portion of the overall boot code (e.g., Basic Input/Output System or BIOS code), or alternatively, the boot block code can refer to code that is separate from the overall boot code but which is executed before the overall boot code. The boot block code is the initial piece of code that is executed upon startup of the electronic device (e.g., power on, reset, etc.).

The boot block code is typically secure, and cannot easily be tampered with by unauthorized users or applications. Thus, it can be assumed that during execution of the boot block code, the electronic device is in a trustworthy state. Executing the alternate boot task during the boot block part of the boot procedure thus increases the likelihood that alternate boot task can be performed properly, without interference by malicious or other unauthorized code. For example, malicious or other unauthorized code may have caused the electronic device to fail or experience another fault, which triggers performance of an error recovery task on the next boot. Performing the error recovery during the boot block part allows the error recovery to be performed during a secure state of the boot procedure, without interference by malicious or other unauthorized code.

If the electronic device is configured such that access of the persistent secondary storage is prevented during the boot block part of the boot procedure, then some or all of the alternate boot tasks mentioned above would not be able to access information in the secondary persistent storage to properly perform the alternate boot task. In accordance with some embodiments, to address this issue, a mechanism is provided to disable a feature that prevents access to the persistent secondary storage during the boot block part of the boot procedure. With this feature disabled, the alternate boot task can access information stored in the persistent secondary storage to enable proper performance of alternate boot operations.

In some implementations, the feature that prevents access of the persistent secondary storage during the boot block part of the boot procedure is a disk cache feature that includes a cache memory (sometimes referred to as a turbo memory) for caching data of the persistent secondary storage. The disk cache (or turbo memory) stores data of the persistent secondary storage to allow faster access of such data, since the disk cache typically is implemented with a semiconductor storage device (or devices), such as flash memory device(s), with a faster access speed than that of the persistent secondary storage.

As used here, the term "persistent secondary storage" refers to one or more storage devices that are used as the main storage of the electronic device, where the content of this main storage is maintained across power cycles (in other words, deactivation of the power supply of the electronic device does not cause the content of the main storage to be lost). The persistent secondary storage can be implemented with disk-based storage devices, such as magnetic disk-based storage devices (e.g., hard disk drives) or optical disk-based storage devices. Alternatively, the persistent secondary storage can also be implemented with storage devices according to other technologies. The term "electronic device" refers to any device that includes electronic components, such as a computer, a personal digital assistant (PDA), a smart phone, a storage system, a communications device, and so forth.

FIG. 1 illustrates an exemplary arrangement of a computer 100. In the ensuing discussion, reference is made to embodiments that are implemented in the context of a computer. Note, however, that some embodiments of the invention can also be implemented in other types of electronic devices.

The computer 100 includes a persistent secondary storage 102 that stores various information, including a recovery image 104 that is used for performing error recovery. The recovery image 104 can include boot code, software, and data to cause the computer 100 to be placed in a known valid or safe state. The persistent secondary storage 102 can also store a primary operating system 105 for the computer 100. The primary operating system 105 (e.g., WINDOWS® operating system) is the operating system that is normally loaded for execution in the computer 100 by a boot procedure.

The persistent secondary storage 102 also stores other information, including an alternate operating system 107 (e.g., a Linux operating system). A setting can be modified in the computer 100 of FIG. 1 to cause loading of the alternate operating system 107 instead of the primary operating system 105. The persistent secondary storage 102 can also store EFI code to load an EFI application. Also, the persistent secondary storage 102 can store preboot application software (not shown) that is to be loaded before normal the boot procedure. Some of the components depicted as being stored in the persistent secondary storage 102 can be omitted in alternative implementations.

The computer 100 also includes a non-volatile memory 106, which is used to store boot code and other code of the computer. The non-volatile memory 106 is usually implemented with flash memory device(s) or other types of semiconductor storage device(s) capable of maintaining their content when computer power is removed. The non-volatile memory 106 includes BIOS code 108. The BIOS code 108 includes various portions, including a boot block code 110 (that is the first to be executed during a boot procedure), and a power-on-self-test (POST) code 114, which is executed after the boot block code 110 to perform various initialization tasks, including checking for the integrity of the BIOS code 108, initializing electronic components of the computer, and other tasks. The BIOS code 108 may include other portions not shown.

The non-volatile memory 106 also includes alternate boot task code 112, which can be invoked by the boot block code 110 to perform an alternate boot task, such as an error recovery task in response to detection of a previous error or other fault.

The non-volatile memory 106 can also include an option ROM (read-only memory) code 116, which is invoked by the BIOS code 108 to perform certain predefined tasks. The option ROM code 116 can be provided by a vendor of the manufacturer of the computer 100. In one implementation, the option ROM code 116 is used for enabling access of the disk cache 120. Although just one option ROM code 116 is shown in the non-volatile memory 106, it is noted that additional pieces of option ROM code can also be provided for performing other tasks. As examples, another option ROM code can be used for performing tasks with respect to a graphics subsystem (not shown) of the computer 100.

The alternate boot task code 112 and option ROM code 116 can be stored in another storage location (e.g., persistent secondary storage 102) of the computer 100 in a different implementation. Also, although the alternate boot task code 112 and option ROM code 116 are shown outside the BIOS code 108, the alternate boot task code 112 and option ROM code 116 can be considered to be part of the BIOS code 108 in a different implementation.

The computer 100 further includes a chipset that includes a central processing unit (CPU 122) and other chips. Although just one CPU 122 is shown in FIG. 1, it is noted that the computer 100 can alternatively include multiple CPUs. Moreover, the CPU 122 in some implementations can include multiple processing cores that are able to execute in parallel.

The chipset also includes a northbridge controller 124 and a southbridge controller 126. The northbridge controller 124 is also known as a memory controller hub or an integrated memory controller. The northbridge controller 124 typically handles communications among the CPU 122, system memory 128, a graphics controller (not shown), and the southbridge controller 126.

The southbridge controller 126 is also known as an I/O controller hub or a peripheral controller hub. The southbridge controller 126 is used to control access to various I/O devices.

The chipset provides a disk cache feature, which includes a disk cache 120 (either internal disk cache 120A that is part of the chipset, or external disk cache 120B that is outside the chipset), which caches data of the persistent secondary storage 102. The disk cache 120 is controlled by a cache controller 129, which is depicted as being part of the southbridge controller 126 in one example. Although reference is made to a "disk" cache, this does not imply that the persistent secondary storage 102 has to be implemented with disk-based storage devices. The disk cache 120 can be used to cache data for any type of persistent secondary storage 102. The disk cache 120 can be implemented with a memory device, such as a dynamic random access memory (DRAM) device or a NAND flash memory device.

The chipset of the computer 100 can also include a management engine 127, which can be used to perform various management tasks with respect to the computer 100. In the implementation shown in FIG. 1, the management engine 127 is included in the southbridge controller 126. In a different implementation, the management engine 127 can be located elsewhere in the chipset. The management engine 127 can allow for remote management of the computer 100, by an administrator located at a remote machine. In one example implementation, the management engine 127 implements the Active Management Technology (AMT) from Intel Corporation. The management tasks that can be remotely performed using the management engine 127 include, as examples, one or more of the following: monitoring operations of the computer 100, performing maintenance with respect to the computer 100, performing updates to the computer 100, upgrading the computer 100, and repairing the computer 100. The management engine 127 can include a combination of hardware and software.

In some implementations, when the disk cache feature is enabled, access to the persistent secondary storage 102 is prevented during early stages of the boot procedure. What this means is that during the boot block part of the boot procedure, the alternate boot task code 112 if invoked will not be able to access content in the persistent secondary storage 102, such as the recovery image 104, alternate OS 107, and/or EFI code 109. It would not be desirable to run the alternate boot task code 112 after the boot block part of the boot procedure since the computer 100 may not be in a trustworthy state at that point.

To allow access of the persistent secondary storage 102 by the alternate boot task code 112 during the boot block part of the boot procedure, a persistent secondary storage access code 130 according to some embodiments is provided. The persistent secondary storage access code 130 can be stored in the non-volatile memory 106 or in some other storage location of the computer 100. The persistent secondary storage access code 130 is able to disable the disk cache feature (which causes the disk cache 120 to be disabled) during the boot block part of the boot procedure such that the error recovery code 112, if run during the boot block part of the boot procedure, is able to access the recovery image 104 in the persistent secondary storage 102. Although the persistent secondary storage access code 130 is shown as being outside the BIOS code 108, the persistent secondary storage access code 130 can be incorporated as part of the BIOS code 108 in a different implementation.

The persistent secondary storage access code 130 can disable the disk cache feature in one of several different ways. In a first embodiment, the persistent secondary storage access code 130 is able to cause a disk cache disable command to be issued in response to detecting that the computer 100 is in a mode to perform an alternate boot task (e.g., an error recovery mode in response to the computer 100 previously experiencing failure or other fault). The disk cache disable command is sent by the BIOS code 108 to the management engine 127 that is part of the chipset of the computer 100. The management engine 127 responds to the disk cache disable command by disabling the disk cache feature. Once the disk cache feature is disabled, access of the persistent secondary storage 102 is allowed, and the alternate boot task code 112 can access the content of the persistent secondary storage 102 during the boot block part of the boot procedure. More generally, the disk cache disable command can be sent to hardware or firmware to disable the disk cache feature.

In addition to causing the issuance of the disk cache disable command, the persistent secondary storage access code 130 can also cause the BIOS code 108 to issue a disk cache disable F10 option, to allow for system debug.

In an alternative embodiment, the persistent secondary storage access code 130 can cause the BIOS code 108 to activate a particular input 140 of the southbridge controller 126 (or another chip in the computer). The input 140 can be a GPIO (general purpose input/output) pin (e.g., GPIO pin 33) of the southbridge controller 126, for example. The activated input 140 is used to cause the southbridge controller 126 to temporarily disable the management engine 127. The management engine 127 can be disabled for some predefined time interval, such as 30 minutes or some other time interval. Disabling the management engine 127 causes the disk cache feature to be disabled, thereby allowing the alternate boot task code 112 to access the persistent secondary storage 102.

As yet another alternative implementation, instead of using the code 130, a hardware-based persistent secondary storage access mechanism can be used to disable the disk cache feature. Thus, generally, a persistent secondary storage access mechanism for enabling access to the persistent secondary storage can be a software-based mechanism or a hardware-based mechanism.

In accordance with another embodiment, instead of using a mechanism to explicitly disable the disk cache feature, the chipset of the computer can be powered on with the certain features disabled. The features that are disabled can include vPro features defined by Intel Corporation. The vPro features include AMT features (to allow remote management as discussed above), and other features. Although reference is made to disabling vPro features as one example, it is noted that different implementations can cause disabling of other sets of features in the computer 100. The relevant aspect for some embodiments of the invention is that these features include the disk cache feature, where disabling of set of features (e.g., vPro features) also cause the disk cache feature to be disabled. When the vPro features are disabled, the disk cache feature is also disabled, such that access to the persistent secondary storage 102 is enabled. In this embodiment, the persistent secondary storage enable mechanism includes a configuration of the computer 100 that causes the disk cache feature to be disabled upon computer startup.

Figure 2:
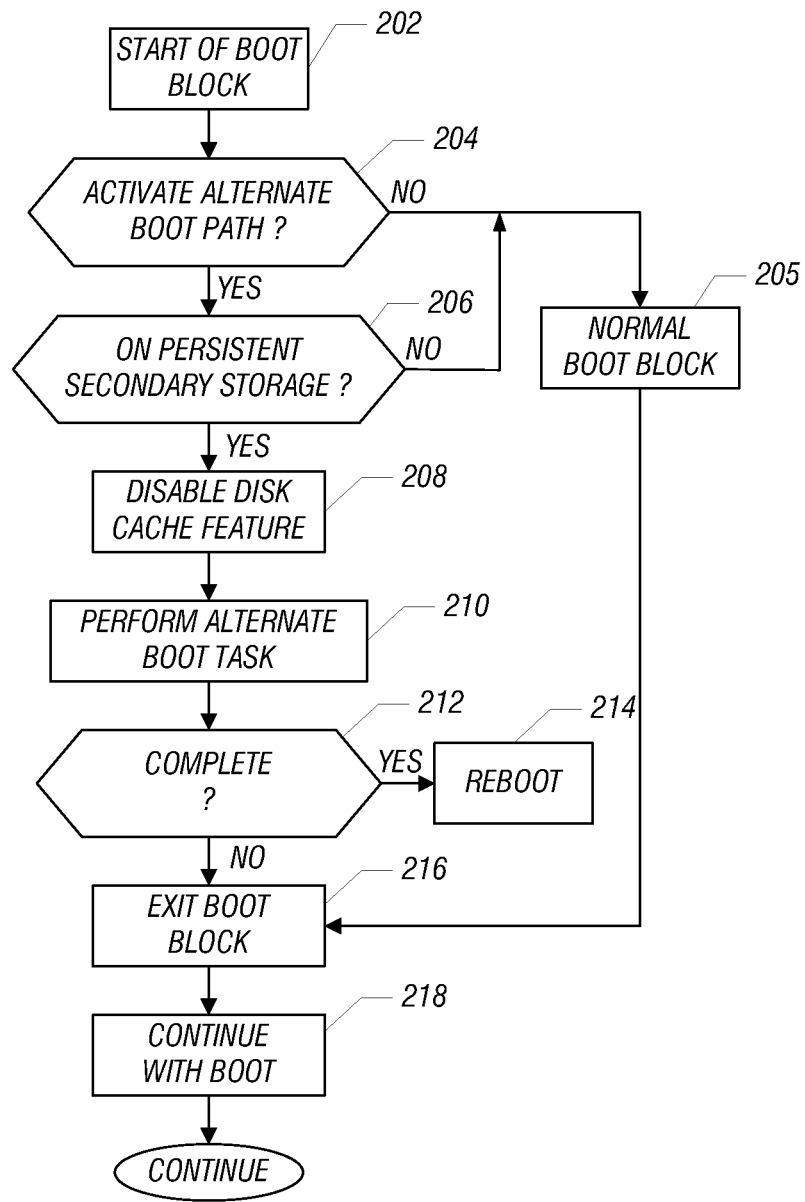
FIG. 2 is a flow diagram of a boot procedure that includes performing an alternate boot task, according to an embodiment.

FIG. 2 illustrates a process according to an embodiment where the disk cache feature powers up enabled. When the computer 100 first starts up, the computer 100 executes the boot block code 110 to start (at 202) the boot block part of the boot procedure. The boot block code 110 can determine (at 204) whether an alternate boot path is activated, which means that an alternate boot task is to be performed. For example, a previous fault may have been detected, which may have caused a flag or other fault indication to be set to cause an error recovery task to be performed on the next boot. Alternatively, a setting may be activated to cause another type of alternate boot task to be performed.

If the alternate boot path is not activated, then a normal boot block operation is performed (at 205). However, if the alternate boot path is activated, the boot block code 110 next determines (at 206) if the relevant information (e.g., recovery image 104, alternate operating system 107, EFI code 109, etc.) to be accessed during the alternate boot task is located in the persistent secondary storage 102. If the relevant information is not stored in the persistent secondary storage 102 but is stored in another location that is accessible during the boot block part of the boot procedure, then the normal boot block operation is performed (at 205).

If the relevant information to be accessed by the alternate boot task is located in the persistent secondary storage 102, then the feature that prevents access to the persistent secondary storage 102 is disabled (at 208) during the boot block part of the boot procedure. In some embodiments, such feature is the disk cache feature. The alternate boot task is then performed (at 210). Since the disk cache feature has been disabled, the alternate boot task code 112 is able to access the content in the persistent secondary storage 102 to perform an alternate boot task.

Next, the boot block code 110 determines (at 212) whether the alternate boot task has completed. For example, if the alternate boot task is the error recovery task, then error recovery would have been completed during the boot block part of the boot procedure. In response to determining that the alternate boot task has completed, the boot block code 110 causes a reboot (at 214) of the computer 100.

Other types of alternate boot tasks, such as loading the alternate operating system 107 or loading the EFI application, may not complete during the boot block part of the boot procedure. In response to determining (at 212) that the alternate boot task is not complete, the boot block code 110 exits (at 216) the boot block part of the boot procedure, and continues (at 218) with the remainder of the boot procedure, where the remaining operations of the alternate boot task are performed along with booting of the computer 100.

Figure 3:
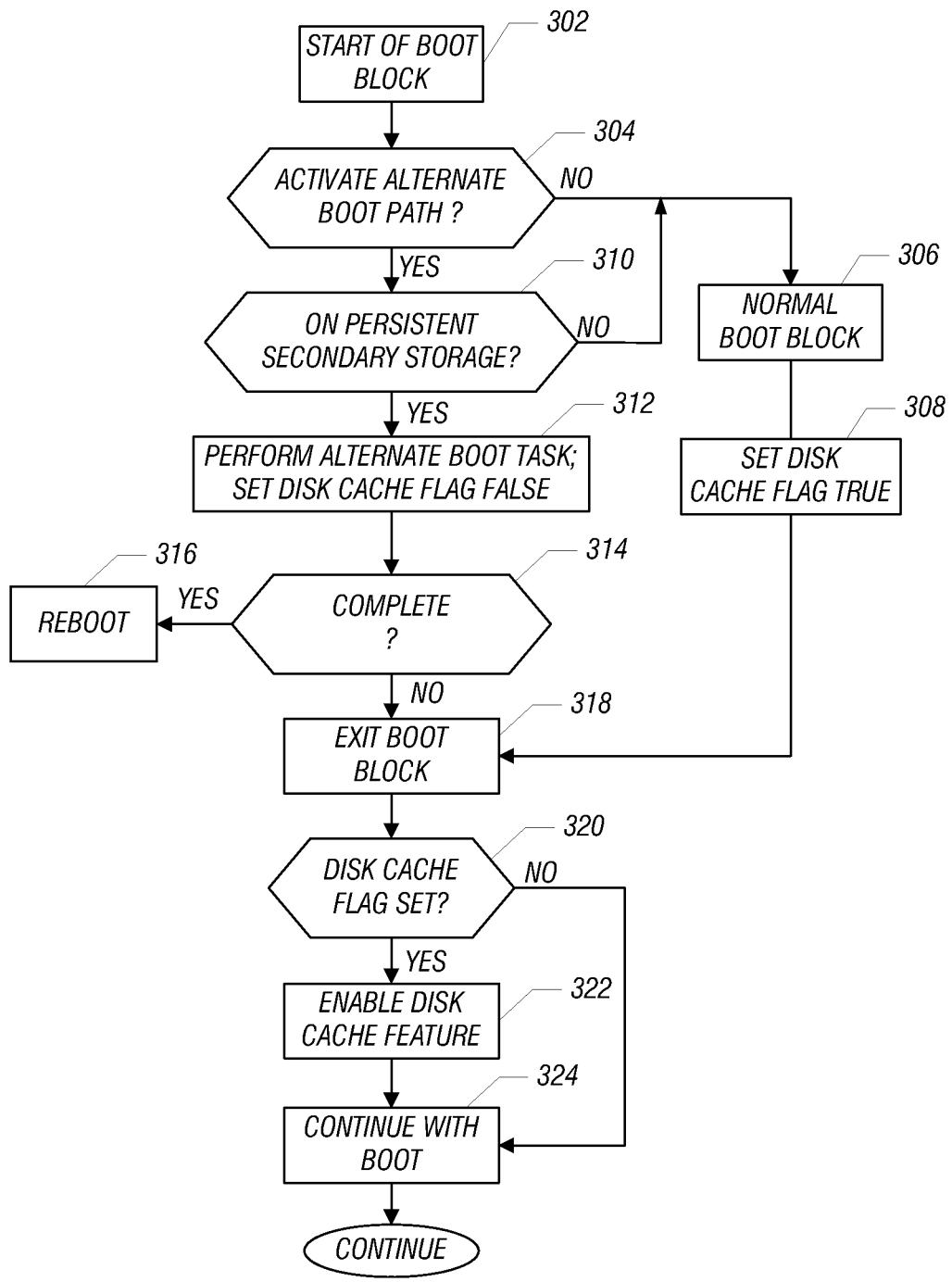
FIG. 3 is a flow diagram of a boot procedure that includes performing an alternate boot task, according to another embodiment.

As noted above, FIG. 2 shows a process in which the disk cache feature is powered up in the enabled state. Alternatively, the disk cache feature can be disabled when the computer starts up. FIG. 3 shows such a process that is performed in this alternative configuration. Upon startup, the computer executes the boot block code 110 to start (at 302) the boot block part of the boot procedure. The boot block code 110 can determine (at 304) whether an alternate boot path is activated, which means that an alternate boot task is to be performed.

If the alternate boot path is not activated, then the boot block code 110 performs the normal boot block operation (at 306). Also, a disk cache flag is set (at 308) to a true state (to allow the disk cache feature to be later enabled).

If the alternate boot path is to be activated, then the boot block code 110 determines (at 310) whether the relevant information to be accessed by the alternate boot task is stored on the persistent secondary storage 102. If not, then the boot block code 110 proceeds to perform (at 306) the normal boot block operation.

However, if the relevant information to be accessed by the alternate boot task is stored on the persistent secondary storage, as determined at 310, then the alternate boot task is performed (at 312). Since the disk cache feature remains disabled, the alternate boot task code 112 is able to access the content in the persistent secondary storage 102 to perform an alternate boot task. As part of the alternate boot task, the disk cache flag is maintained in the false state (note that this flag may have powered up in the false state).

Next, the boot block code 110 determines (at 314) whether the alternate boot task has completed. In response to determining that the alternate boot task has completed, the boot block code 110 causes a reboot (at 316) of the computer 100.

In response to determining (at 314) that the alternate boot task is not complete, the boot block code 110 exits (at 318) the boot block part of the boot procedure. The boot procedure then checks (at 320) the state of the disk cache flag. If the disk cache flag is at the true state, as performed in the normal boot block path that includes tasks 306 and 308, the disk cache feature is enabled (at 322). However, if the disk cache flag is at the false state, then the disk cache feature is not enabled. The operation continues (at 324) with the boot procedure. It may not be desirable to enable the disk cache feature because the alternate operating system 107 or EFI or other feature provided as a result of the alternate boot task may be incompatible with the disk cache feature.

Instructions of code described above (including BIOS code 108, boot block code 110, POST code 114, option ROM code 116, alternate boot task code 112, and persistent secondary storage access code 130 of FIG. 1) are loaded for execution on a processor (such as one or more CPUs 122 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the code) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use with an electronic device having a persistent secondary storage, comprising:
   during a boot block part of a boot procedure, disabling, by the electronic device, a feature that prevents access to the persistent secondary storage, wherein disabling the feature that prevents access to the persistent secondary storage comprises disabling, by issuing a command from a boot code to a hardware controller, a cache feature of the electronic device, wherein the cache feature includes cache memory to cache data of the persistent secondary storage, and wherein the cache feature prevents access to the persistent secondary storage until code is executed after the boot block part of the boot procedure; and
   accessing the persistent secondary storage during the boot block part of the boot procedure to retrieve information to perform a predetermined task.

2. The method of claim 1, wherein accessing the persistent secondary storage to retrieve the information to perform the predetermined task comprises accessing the persistent secondary storage to retrieve information to perform one or more of: error recovery, loading an alternate operating system, loading an Extensible Firmware Interface application, and loading a preboot application.

3. The method of claim 1, wherein disabling the cache feature comprises activating an input to a chip of the electronic device to cause the chip to disable the cache feature.

4. The method of claim 1, further comprising:
   after performing the predetermined task, issuing a command to enable the feature.

5. An electronic device comprising:
   a management engine;
   a persistent secondary storage;
   a processor;
   boot block code executable on the processor to perform an initial part of a boot procedure, wherein the boot block code is executable to perform an alternate boot task;
   a persistent secondary storage access mechanism to, during the initial part of the boot procedure, disable a feature in the electronic device that prevents access to the persistent secondary storage such that the alternate boot task is able to access the persistent secondary storage, the persistent secondary storage access mechanism configured to issue a command to the management engine to cause the management engine to disable the feature; and
   a cache memory to cache data of the persistent secondary storage, wherein the cache memory is part of the feature that prevents access to the persistent secondary storage until code is executed during the boot procedure to enable access to the persistent secondary storage.

6. The electronic device of claim 5, wherein the boot block code is executable to detect whether an alternate boot path is activated, wherein the alternate boot task is performed in response to detecting that the alternate boot path is activated, and wherein the boot block code is executable to not perform the alternate boot task and to not disable the feature in response to detecting that the alternate boot path is not activated.

7. The electronic device of claim 5, wherein the alternate boot task is one or more of: error recovery, loading an alternate operating system, loading an Extensible Firmware Interface application, and loading a preboot application.

8. An electronic device comprising:
a persistent secondary storage;
a processor;
boot block code executable on the processor to perform an initial part of a boot procedure, wherein the boot block code is executable to perform an alternate boot task;
a persistent secondary storage access mechanism to, during the initial part of the boot procedure, disable a cache feature in the electronic device that prevents access to the persistent secondary storage such that the alternate boot task is able to access the persistent secondary storage; and
a controller that has an input, wherein the persistent secondary storage access mechanism is configured to activate the input of the controller to disable the cache feature.

9. The electronic device of claim 5, wherein after performing the alternate boot task, the persistent secondary storage access mechanism is configured to issue a command to enable the feature.

10. An article comprising at least one computer-readable storage medium containing instructions that upon execution cause an electronic device to:
execute a boot block code to perform an initial part of a boot procedure;
during the initial part of the boot procedure performed by the boot block code,
in response to determining that predetermined information is to be retrieved from a persistent secondary storage of the electronic device, execute an access code to cause a boot code to issue a command to a hardware controller to disable a feature that prevents access to the persistent secondary storage, and in response to determining that the predetermined information is not to be retrieved from the persistent secondary storage, enable the feature; and during the initial part of the boot procedure performed by the boot block code, invoke code to perform a predetermined task, where the predetermined task is to access the persistent secondary storage to retrieve the predetermined information.

11. The article of claim 10, wherein invoking the code to perform the predetermined task comprises invoking the code to perform one or more of: error recovery, loading an alternate operating system, loading an Extensible Firmware Interface application, and loading a preboot application.

12. The electronic device of claim 8, wherein the controller is a southbridge controller.

13. The article of claim 10, wherein disabling the feature that prevents access to the persistent secondary storage comprises disabling a cache feature of the electronic device, wherein the cache feature includes cache memory to cache data of the persistent secondary storage, and wherein the cache feature prevents access to the persistent secondary storage until code is executed after the initial part of the boot procedure.

14. The method of claim 1, wherein disabling the cache feature prevents use of the cache memory.

15. The method of claim 1, wherein the persistent secondary storage includes at least one storage device, and wherein the cache feature prevents access of the at least one storage device during the boot block part of the boot procedure.

16. The electronic device of claim 5, wherein the persistent secondary storage includes at least one storage device, and wherein the feature including the cache memory prevents access to the at least one storage device during the initial part of the boot procedure.

17. The article of claim 13, wherein the persistent secondary storage includes at least one storage device, and wherein the cache feature prevents access of the at least one storage device during the initial part of the boot procedure.

* * * * *